United States Patent
Shih et al.

(10) Patent No.: US 8,240,057 B2
(45) Date of Patent: Aug. 14, 2012

(54) SELF-ALIGNED STYLUS WITH HIGH-SPHERICITY AND METHOD OF MANUFACTURING THE SAME

(75) Inventors: Wen-Pin Shih, Taipei (TW); Yao-Chuan Tsai, Taipei (TW); Duo-Ru Chang, Taipei (TW); Li-Chi Tsao, Taipei (TW); Ming-Dao Wu, Taipei (TW); Po-Jen Shih, Taipei (TW)

(73) Assignee: National Taiwan University, Taipei (TW)

( * ) Notice: Subject to any disclaimer, the term of this patent is extended or adjusted under 35 U.S.C. 154(b) by 1149 days.

(21) Appl. No.: 12/107,495

(22) Filed: Apr. 22, 2008

(65) Prior Publication Data

US 2009/0109196 A1 Apr. 30, 2009

(30) Foreign Application Priority Data

Oct. 29, 2007 (TW) ................................. 96140519 A (51) Int. Cl.
*G01B 5/008* (2006.01)
(52) U.S. Cl. ........................................................ 33/559
(58) Field of Classification Search ................. 33/503, 33/556

See application file for complete search history.

(56) References Cited

U.S. PATENT DOCUMENTS

| | | | |
|---|---|---|---|
| 2008/0083127 A1* | 4/2008 | McMurtry et al. | 33/502 |
| 2009/0109196 A1* | 4/2009 | Shih et al. | 345/179 |
| 2009/0307915 A1* | 12/2009 | Sutherland | 33/502 |
| 2010/0330284 A1* | 12/2010 | Bocian et al. | 427/340 |
| 2011/0010931 A1* | 1/2011 | Sheu | 29/745 |
| 2011/0061253 A1* | 3/2011 | Jonas et al. | 33/503 |
| 2012/0055037 A1* | 3/2012 | Kumagai et al. | 33/503 |

OTHER PUBLICATIONS

Tsai, et al., "Self-Aligned Stylus With High Sphericity for Micro Coordinate Measurement", The 14th International Conference on Solid-State Sensors, Actuators and Microsystems, pp. 1641-1644, 2007.
Cheung, et al., "Fabrication of nanopillars by nanosphere lithography", Nanotechnology 17:5, Mar. 14, 2006, pp. 1339-1343.
Kagami, et al., "Light-induced self-written three-dimensioinal optical waveguide", Applied Physics Letters, vol. 79, No. 8, Aug. 20, 2001, pp. 1079-1081.
Liu, et al., "Process research of high aspect ratio microstructure using SU-8 resist", Microsystem Technologies 10, 2004, pp. 265-268.

\* cited by examiner

*Primary Examiner* — G. Bradley Bennett
(74) *Attorney, Agent, or Firm* — Muncy, Geissler, Olds & Lowe, PLLC (57) ABSTRACT

A method of manufacturing a self-aligned stylus with high sphericity includes the steps of: forming a polymeric layer on a substrate; placing a sphere on the polymeric layer; softening the polymeric layer to make a portion of the sphere sink into the polymeric layer; forming a specific light absorbing layer on the polymeric layer; illuminating the sphere and the specific light absorbing layer with specific light such that the specific light is focused by the sphere to expose the polymeric layer to form an exposed portion and an unexposed portion; removing the specific light absorbing layer; and baking the polymeric layer and then removing the unexposed portion. A self-aligned stylus with high sphericity is also disclosed.

16 Claims, 7 Drawing Sheets

SELF-ALIGNED STYLUS WITH HIGH-SPHERICITY AND METHOD OF MANUFACTURING THE SAME

This application claims priority of No. 096140519 filed in Taiwan R.O.C. on Oct. 29, 2007 under 35 USC 119, the entire content of which is hereby incorporated by reference.

BACKGROUND OF THE INVENTION

1. Field of Invention

The invention relates to a stylus and a method of manufacturing the same, and more particularly to a self-aligned stylus with high sphericity and a method of manufacturing the same.

2. Related Art

The trend towards miniaturization and modularization in manufacturing has led to a requirement for a coordinate measuring machine (CMM) capable of measuring tiny features on small components. Surface profilers, micro coordinate measurement machines (μCMMS), and scanning probe microscopes (SPMs) have been developed to measure three dimensional coordinates of structures from nanometer to micrometer scales. As for the high-precision micro-metrology, in order to measure three-dimensional features, such as deep trenches, sidewalls and nozzles, having the high aspect ratio, it is also necessary to use micro-spherical scanning probes which are accurately fabricated for high sphericity. In the μCMM field, spherical pellets with diameters ranging from hundreds nanometers to tens micrometers are commonly attached on the micro-probes.

In practical μCMM applications, any angular orientation variation between an object and the measurement reference component may result in so-called "Abbe error" in measuring the linear displacement or the spatial dimension of the object. From Abbe error theory, the sphericity of these spherical styluses and the alignment between the contact sphere and the stylus pin are the key roles in the μCMM accuracy.

The wire electro-discharge grinding (WEDG) technology has been developed to fabricate the vibroscanning probe. By combining the WEDG with one pulse electro-discharge, a burnished micro-spherical probe with 40 μm diameter has been fabricated.

Figure 12:
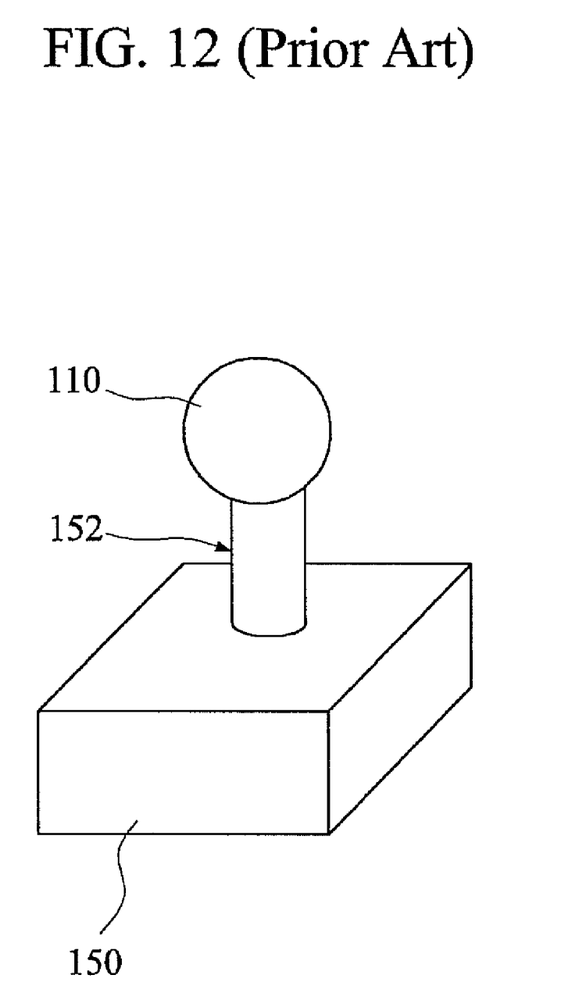
FIG. 12 is a pictorial view showing a conventional stylus.

FIG. 12 is a pictorial view showing a conventional stylus. Referring to FIG. 12, the conventional stylus includes a substrate 150, a stylus pin 152 and a sphere 110. The stylus pin 152 is connected to the substrate 150 and the sphere 110. The stylus fabricated by way of WEDG has many drawbacks. For example, the sphericity of the sphere 110 is not high, the sphere 110 is not well aligned with the stylus pin 152, and the surface of the sphere 110 is very rough. These drawbacks make the measured result of the μCMM system become inaccurate. In addition, the sphere 110, the substrate 150 and the stylus pin 152 have to be made of conductors, and cannot isolate charges and heat of the object in some occasions.

Thus, it is an important subject of the invention to provide a stylus, which has high sphericity, a well aligned state and a smooth surface.

SUMMARY OF THE INVENTION

It is therefore an object of the invention to provide a self-aligned stylus with high sphericity and a method of manufacturing the same, wherein spheres are formed in liquid such that each sphere has the high sphericity. Then, the sphere serves as a lens for focusing light to facilitate the alignment between the sphere and a second cylinder of a stylus pin. In addition, the sphere may also serve as a mask when a substrate is being etched so that a first cylinder of the stylus pin may be formed, and the first cylinder, the second cylinder and the sphere are well aligned.

The invention achieves the above-identified object by providing a method of manufacturing a self-aligned stylus with high sphericity. The method includes the steps of: forming a polymeric layer on a substrate; placing a sphere on the polymeric layer; softening the polymeric layer to make a portion of the sphere sink into the polymeric layer; forming a specific light absorbing layer on the polymeric layer; illuminating the sphere and the specific light absorbing layer with specific light such that the specific light is focused by the sphere to expose the polymeric layer to form an exposed portion and an unexposed portion; removing the specific light absorbing layer; and baking the polymeric layer and then removing the unexposed portion.

The invention also provides a self-aligned stylus with high sphericity. The stylus includes a substrate, a first cylinder having a first end connected to the substrate, a second cylinder having a first end connected to a second end of the first cylinder, and a sphere connected to a second end of the second cylinder. A first cross-section area of the second end of the first cylinder is larger than a second cross-section area of the first end of the second cylinder.

Consequently, the invention provides a stylus with high sphericity to be used in the μCMM system and a method of manufacturing the stylus without using a mask. In detail, SU-8 polymeric micro-spheres are formed in the liquid according to the property of surface tension so that the microsphere has the high sphericity, and the stylus pin under the micro-sphere is also manufactured in the self-aligned manner. In addition, the height of the stylus pin may further be increased by way of dry etching. The manufactured microsphere has the very small spatial error, and is very suitable for the μCMM system. Furthermore, the two-stage stylus cylinder can intensify the overall stylus and further prevent the stylus from interfering with the to-be-measured object.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
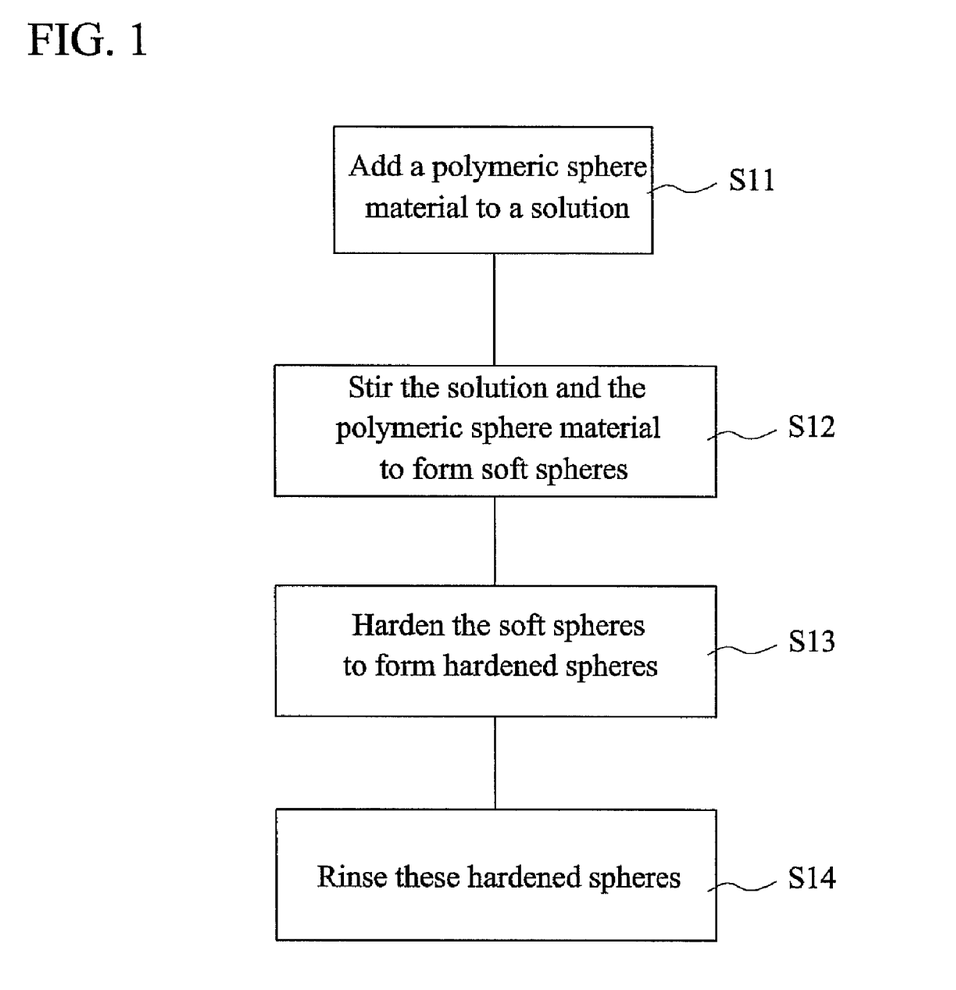
FIG. 1 is a flow chart showing a method of manufacturing a sphere for a self-aligned stylus with high sphericity according to a preferred embodiment of the invention.

FIG. 1 is a flow chart showing a method of manufacturing a sphere for a self-aligned stylus with high sphericity according to a preferred embodiment of the invention. The sphere is a micro-sphere with high sphericity and may be manufactured according to various methods. In the following example, one method will be illustrated.

As shown in FIG. 1, the sphere may be formed according to the following steps. First, in step S11, a polymeric sphere material (e.g., an SU-8 material) is added to a solution, such as a sodium dodecylbenzenesulfonate (NaDBS) solution. In this step, the density of the NaDBS solution has to be adjusted to be the same as that of the SU-8 polymeric material so that the effect of gravity on the SU-8 polymeric material can be eliminated during the manufacturing process. Because the SU-8 polymeric material is insoluble in the NaDBS solution, the surface tension between these two liquids separates the SU-8 polymeric material into small segments.

Then, in step S12, the solution and the polymeric sphere material are stirred to form a plurality of soft spheres. In this step, the dimensions of the soft spheres are gradually reduced, and the interfacial energy between the SU-8 polymeric material and the NaDBS solution becomes large enough to overcome the strain energy for deforming the soft spheres into perfect spheres.

Next, in step S13, the soft spheres are hardened to form a plurality of hardened spheres. In this step, the solution is heated to, for example, 95° C. for 30 minutes, and an ultra-violet ray is provided to illuminate the soft spheres to harden these soft spheres. The ultra-violet ray illuminating and heating processes make the soft sphere cure, and the overall processes are conducted inside the heated NaDBS solution to avoid possible viscoelastic deformation under gravity. After the curing process, the density of the SU-8 spheres is increased and becomes larger than that of the NaDBS solution due to the volume contraction of polymerization. As a result, these SU-8 spheres precipitate in the NaDBS solution.

Finally, in step S14, these hardened spheres are taken out from the NaDBS solution and rinsed with acetone and deionized water. The micro-sphere is thus manufactured.

Figure 2:
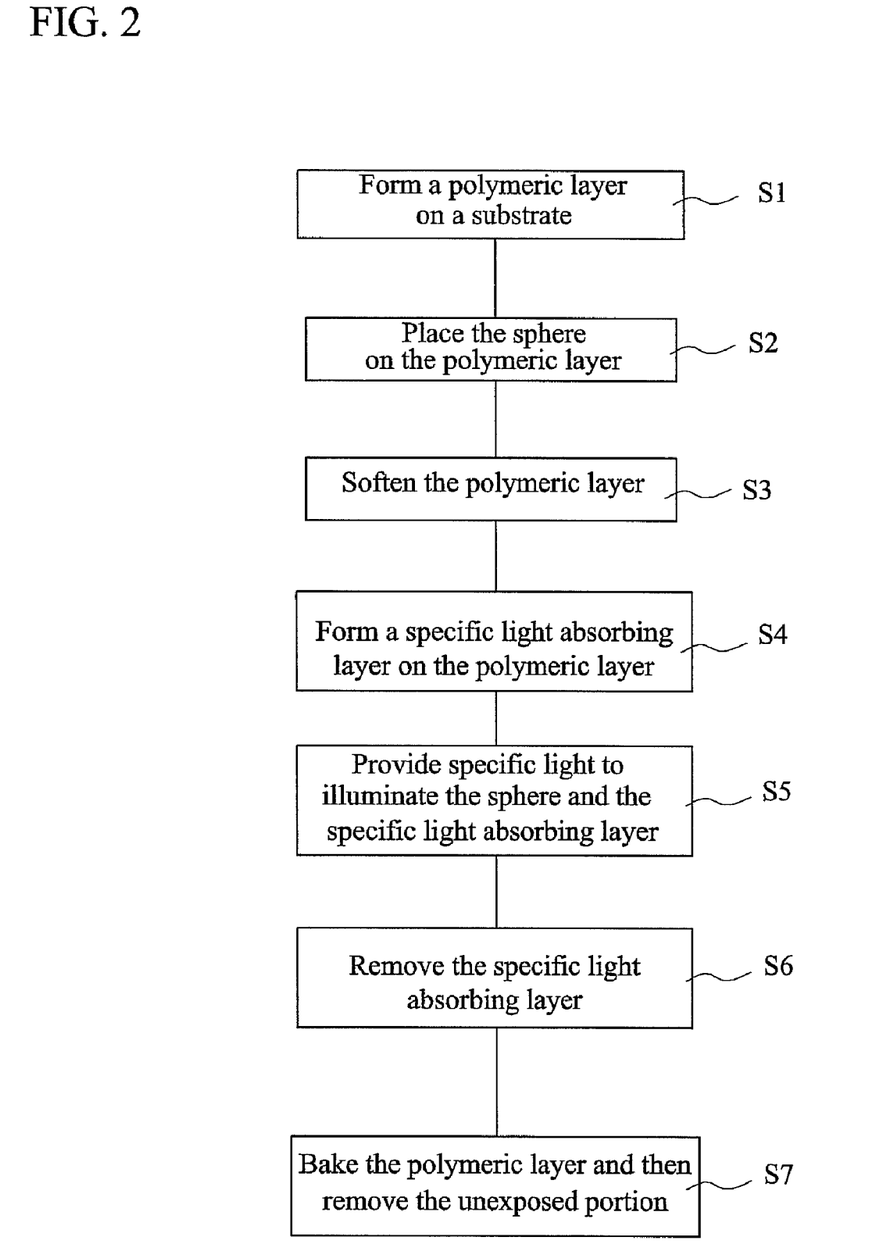
FIG. 2 is a flow chart showing a method of manufacturing the self-aligned stylus with high sphericity according to the preferred embodiment of the invention.

FIG. 2 is a flow chart showing a method of manufacturing the self-aligned stylus with high sphericity according to the preferred embodiment of the invention. FIGS. 3 to 9 are cross-sectional views corresponding to various steps of the manufacturing method of FIG. 2.

Referring to FIGS. 2 to 9, the method of the invention includes the following steps. It is to be noted that the process of processing only one single sphere is illustrated because the processes of processing the spheres are the same although many spheres are depicted in the drawing.

Figure 3:
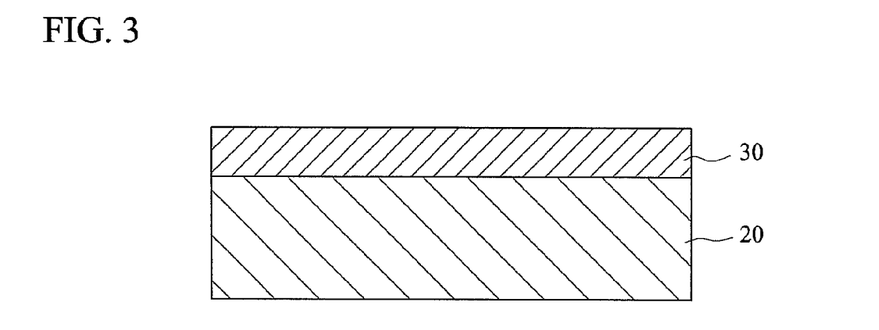
FIGS. 3 to 9 are cross-sectional views corresponding to various steps of the manufacturing method of FIG. 2.

First, in step S1, a polymeric layer 30 having the thickness of 100 microns, for example, is formed on a substrate 20, as shown in FIG. 3. The substrate 20 may be a silicon substrate, for example. The polymeric layer 30 is made of the SU-8 material. Therefore, the polymeric layer 30 and a sphere 10 are made of the same material (SU-8 material).

Figure 4:
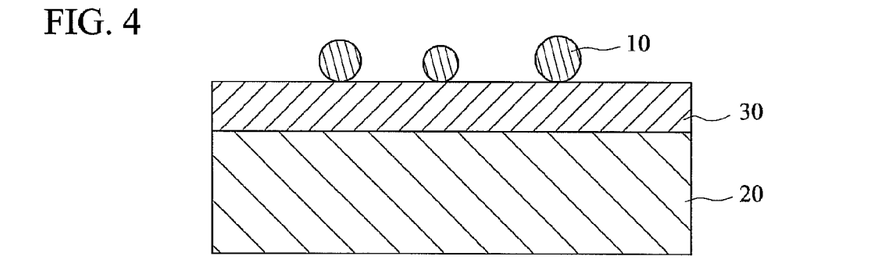

Then, in step S2, the sphere 10 is placed on the polymeric layer 30, as shown in FIG. 4. For example, the polymeric layer 30 may be pre-baked at 65° C. for ten minutes and soft-backed at 95° C. for 30 minutes. Then, the sphere 10 is placed on the polymeric layer 30.

Figure 5:
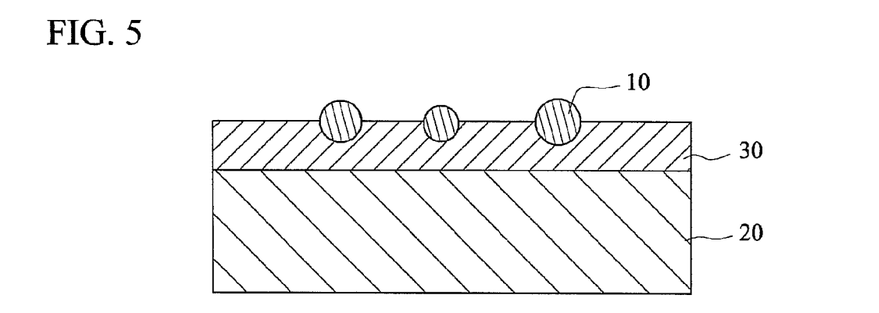

Next, in step S3, the polymeric layer 30 is softened to make one portion of the sphere 10 sink into the polymeric layer 30 so that the focal plane is moved to the unexposed polymeric layer 30, as shown in FIG. 5. For example, it is possible to heat the polymeric layer 30 to 95° C. to soften the polymeric layer 30 so that one half of the sphere 10 sinks into the polymeric layer 30 and a semi-circular micron lens is thus formed.

Figure 6:
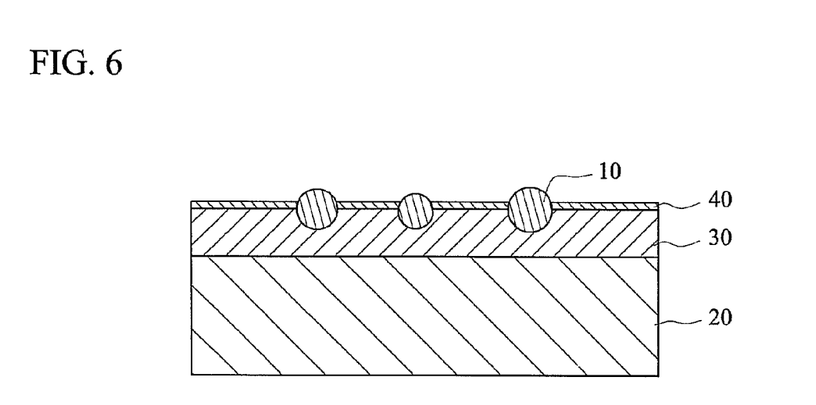

Then, in step S4, a specific light absorbing layer 40 is formed on the polymeric layer 30, as shown in FIG. 6. For example, the specific light absorbing layer 40 is an ultra-violet ray absorbing layer for absorbing an ultra-violet ray.

Figure 7:
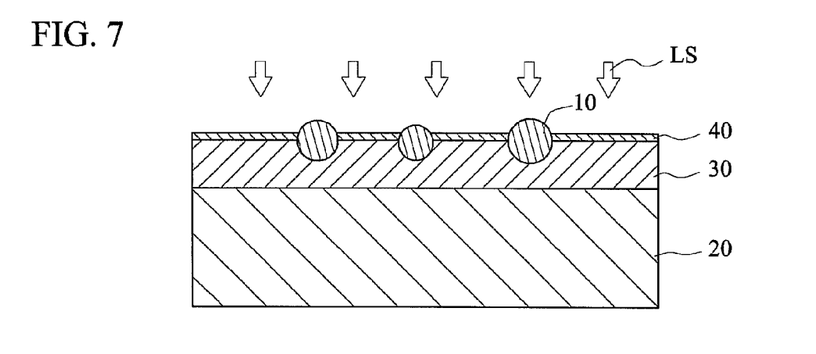
Figure 10:
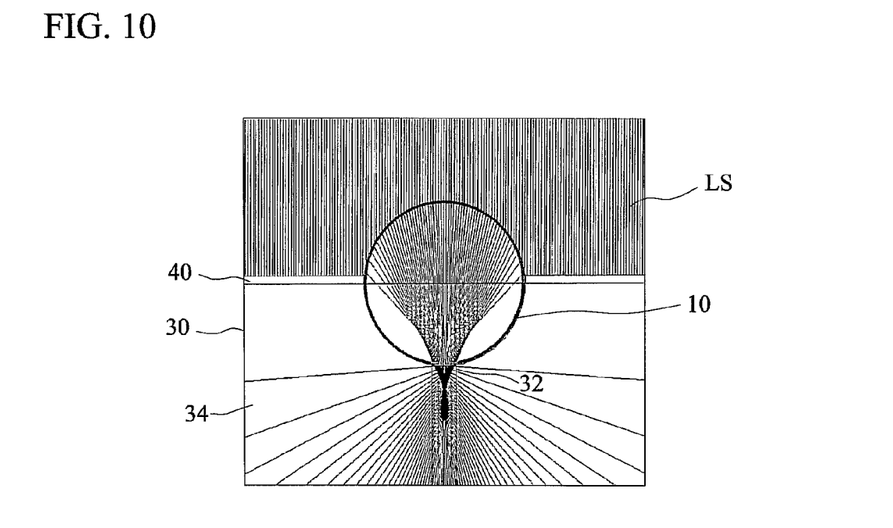
FIG. 10 is a schematic illustration showing the sphere serving as a focus lens in the method of manufacturing the self-aligned stylus of the invention.

Next, in step S5, specific light (e.g., the ultra-violet ray) LS is provided to illuminate the sphere 10 and the specific light absorbing layer 40 before the ultra-violet ray absorbing layer solidifies. The specific light is focused by the sphere 10 to expose the polymeric layer 30 to form an exposed portion (waveguide) 32 and an unexposed portion 34, as shown in FIGS. 7 and 10. In FIG. 10, the exposed extent of the portion under the sphere 10 is higher and thus forms the exposed portion 32, and the exposed extent of the other portion is lower and thus forms the unexposed portion 34.

Then, in step S6, the specific light absorbing layer 40 is removed using the deionized water, for example.

Figure 8:
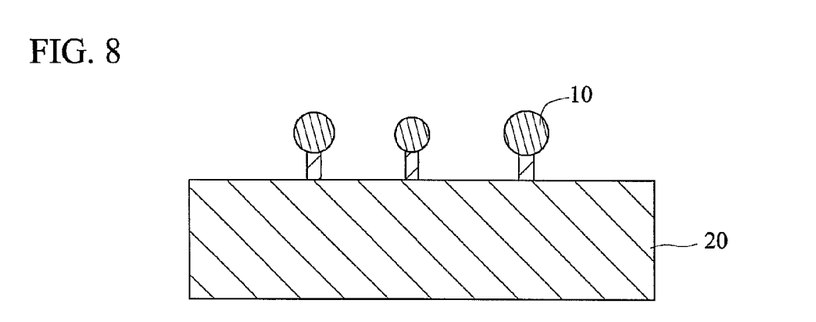

Next, in step S7, the polymeric layer 30 is baked to make the SU-8 polymeric material of the exposed portion 32 bond. Then, the unexposed portion 34 is removed, as shown in FIG. 8. The baking process is performed at 65° C. for one minute and at 95° C. for ten minutes. Finally, the substrate 20 and the exposed portion 32 are developed and hard-backed to form the self-aligned stylus.

Thus, the transparent micro-sphere 10 serves as the lens and the ultra-violet ray absorber is applied to the polymeric layer 30 to surround the micro-sphere 10 so that the stylus pin may be formed under the micro-sphere 10 and aligned with the micro-sphere 10 according to the exposure and the associated processes.

Figure 9:
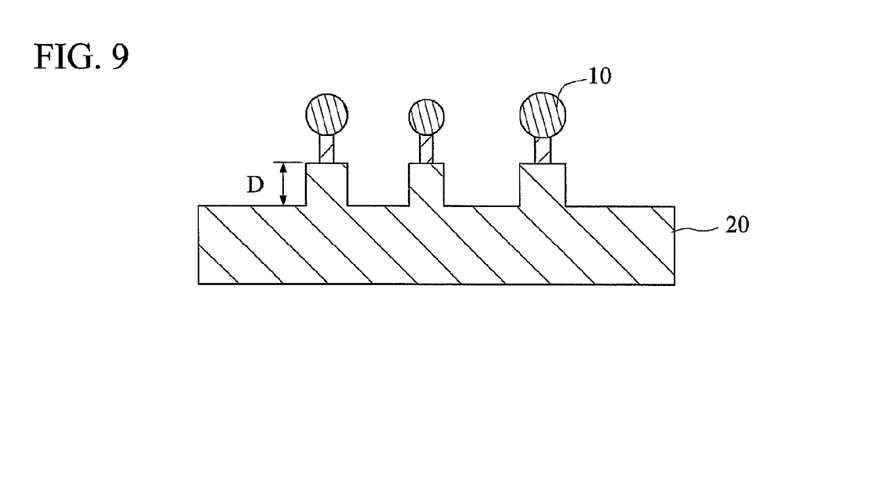

If the overall height of the stylus is to be increased, the following step may be performed. As shown in FIG. 9, the substrate 20 is etched by a predetermined depth D with the sphere 10 serving as a mask. In this step, the substrate 20 is etched by way of dry etching such as inductive coupling plasma (ICP) etching or reactive ion etching (RIE).

Figure 11:
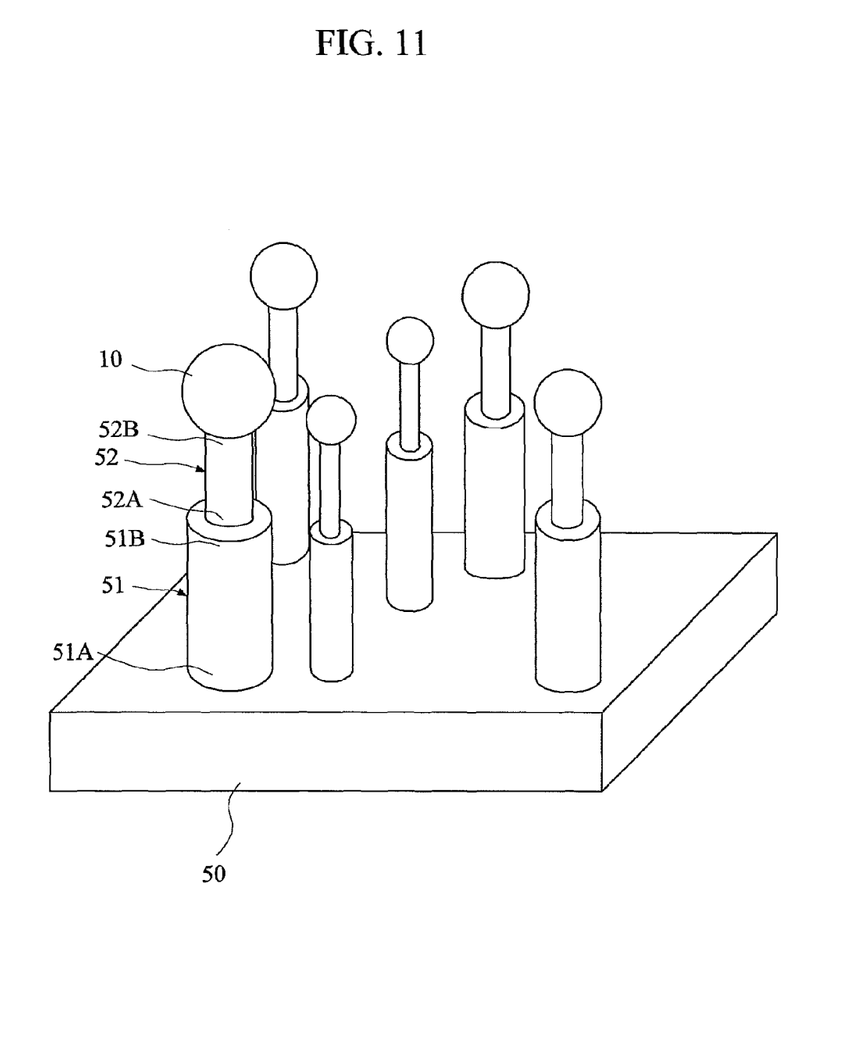
FIG. 11 is a pictorial view showing the self-aligned stylus with high sphericity according to the preferred embodiment of the invention.

FIG. 11 is a pictorial view showing the self-aligned stylus with high sphericity according to the preferred embodiment of the invention. Referring to FIG. 11, the self-aligned stylus manufactured according to the method of the invention includes a substrate 50, a first cylinder 51, a second cylinder 52 and the sphere 10.

The first cylinder 51 has a first end 51A connected to the substrate 50, and the second cylinder 52 has a first end 52A connected to a second end 51B of the first cylinder 51. The sphere 10 is connected to a second end 52B of the second cylinder 52. A first cross-section area of the second end 51B of the first cylinder 51 is larger than a second cross-section area of the first end 52A of the second cylinder 52.

As mentioned hereinabove, the sphere 10 and the second cylinder 52 are made of the same material (e.g., the SU-8 material), and the substrate 50 and the first cylinder 51 are made of the same material (e.g., silicon). In addition, the first cross-section area and the second cross-section area have substantially circular shapes.

In summary, the invention provides a stylus with high sphericity to be used in the μCMM system and a method of manufacturing the stylus without using a mask. In detail, SU-8 polymeric micro-spheres are formed in the liquid according to the property of surface tension so that the micro-sphere has the high sphericity, and the stylus pin under the micro-sphere is also manufactured in the self-aligned manner. In addition, the height of the stylus pin may further be increased by way of dry etching. The manufactured micro-sphere has the very small spatial error, and is very suitable for the μCMM system. Furthermore, the two-stage stylus cylinder can intensify the overall stylus and further prevent the stylus from interfering with the to-be-measured object.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method of manufacturing a self-aligned stylus with high sphericity, the method comprising the steps of:
   (a) forming a polymeric layer on a substrate;
   (b) placing a sphere on the polymeric layer;
   (c) softening the polymeric layer to make a portion of the sphere sink into the polymeric layer;
   (d) forming a specific light absorbing layer on the polymeric layer;
   (e) illuminating the sphere and the specific light absorbing layer with specific light such that the specific light is focused by the sphere to expose the polymeric layer to form an exposed portion and an unexposed portion;
   (f) removing the specific light absorbing layer; and
   (g) baking the polymeric layer and then removing the unexposed portion.

2. The method according to claim 1, wherein the sphere is formed by the sub-steps of:
   adding a polymeric sphere material to a solution;
   stirring the solution and the polymeric sphere material to form a plurality of soft spheres;
   hardening the soft spheres to from a plurality of hardened spheres; and
   rinsing the hardened spheres.

3. The method according to claim 2, wherein the soft spheres are hardened by heating the solution and illuminating the soft spheres with an ultra-violet ray.

4. The method according to claim 2, wherein the polymeric sphere material is an SU-8 material, and the solution is a sodium dodecylbenzenesulfonate (NaDBS) solution.

5. The method according to claim 1, wherein the polymeric layer is made of an SU-8 material.

6. The method according to claim 1, wherein the polymeric layer and the sphere is made of an SU-8 material.

7. The method according to claim 1, wherein in the step (c), the polymeric layer is softened by heating the polymeric layer.

8. The method according to claim 1, wherein one half of the sphere sinks into the polymeric layer.

9. The method according to claim 1, wherein the specific light absorbing layer is an ultra-violet ray absorbing layer for absorbing an ultra-violet ray, and the specific light is the ultra-violet ray.

10. The method according to claim 1, further comprising the step of:
    (h) etching the substrate by a predetermined depth with the sphere serving as a mask.

11. The method according to claim 10, wherein the substrate is etched by way of dry etching.

12. The method according to claim 10, wherein the substrate is etched by way of inductive coupling plasma (ICP) etching or reactive ion etching (RIE).

13. A self-aligned stylus with high sphericity, the stylus comprising:
    a substrate;
    a first cylinder having a first end connected to the substrate;
    a second cylinder having a first end connected to a second end of the first cylinder; and
    a sphere connected to a second end of the second cylinder, wherein a first cross-section area of the second end of the first cylinder is larger than a second cross-section area of the first end of the second cylinder.

14. The self-aligned stylus according to claim 13, wherein the sphere and the second cylinder are made of the same material.

15. The self-aligned stylus according to claim 13, wherein the substrate and the first cylinder are made of the same material.

16. The self-aligned stylus according to claim 13, wherein the first cross-section area and the second cross-section area have substantially circular shapes.

* * * * *